(12) United States Patent
Kobayashi

(10) Patent No.: US 8,353,519 B2
(45) Date of Patent: Jan. 15, 2013

(54) SEALING DEVICE

(75) Inventor: Naoto Kobayashi, Fukushima (JP)

(73) Assignee: NOK Corporation (JP)

( * ) Notice: Subject to any disclaimer, the term of this patent is extended or adjusted under 35 U.S.C. 154(b) by 16 days.

(21) Appl. No.: 13/192,980

(22) Filed: Jul. 28, 2011

(65) Prior Publication Data

US 2011/0278800 A1    Nov. 17, 2011

Related U.S. Application Data

(63) Continuation of application No. 12/225,510, filed as application No. PCT/JP2007/055174 on Mar. 15, 2007, now Pat. No. 8,087,673.

(30) Foreign Application Priority Data

Mar. 31, 2006    (JP) ................................. 2006-098356

(51) Int. Cl.
*F16J 3/00* (2006.01)
*F16J 15/34* (2006.01)

(52) U.S. Cl. ........................................ 277/317; 277/448

(58) Field of Classification Search .................. 277/317, 277/353, 349, 562; 384/448
See application file for complete search history.

(56) References Cited

U.S. PATENT DOCUMENTS

| | | |
|---|---|---|
| 4,516,783 A | 5/1985 | Mitsue et al. |
| 4,721,312 A | 1/1988 | Hornberger |
| 5,096,207 A | 3/1992 | Seeh et al. |
| 5,407,213 A | 4/1995 | Ouchi et al. |
| 5,431,413 A | 7/1995 | Hajzler |
| 5,458,420 A | 10/1995 | Otto |
| 5,575,568 A | 11/1996 | Rigaux et al. |
| 5,611,548 A | 3/1997 | Dahlhaus |
| 5,695,289 A | 12/1997 | Ouchi et al. |
| 5,893,648 A | 4/1999 | Smith |
| 5,947,611 A | 9/1999 | Nagase |
| 6,065,879 A | 5/2000 | Mitsue et al. |
| 6,170,992 B1 | 1/2001 | Angelo et al. |
| 6,206,380 B1 | 3/2001 | Miyazaki |
| 6,457,869 B1 | 10/2002 | Smith et al. |
| 6,499,885 B2 | 12/2002 | Toda et al. |
| 6,520,683 B2 | 2/2003 | Toda et al. |
| 6,682,221 B2 | 1/2004 | Rutter et al. |
| 6,939,050 B2 | 9/2005 | Ohtsuki et al. |

(Continued)

FOREIGN PATENT DOCUMENTS

EP    1 164 318    12/2001

(Continued)

*Primary Examiner* — Vishal Patel
(74) *Attorney, Agent, or Firm* — Harness, Dickey & Pierce, P.L.C.

(57) ABSTRACT

A sealing device includes a stationary side installation ring fixed to a stationary side member, a rotation side installation ring fixed to a rotation side member, a stationary side lip integrally provided on the stationary side installation ring and slidably contacting the rotation side installation ring, rotation side lips integrally formed on the rotation side installation ring and slidably contacting the stationary side installation ring, and a pulsar ring for a rotary encoder integrally formed on the rotation side installation ring, and magnetized to be multipolar. The rotation side installation ring includes first and second rotation side installation rings which are attached to each other. The rotation side lips are provided on the first rotation side installation ring at a relatively inner side. The pulsar ring is provided on the second rotation side installation ring at a relatively outer side.

5 Claims, 9 Drawing Sheets

U.S. PATENT DOCUMENTS

| | | |
|---|---|---|
| 6,943,542 B2 | 9/2005 | Sentoku et al. |
| 6,979,001 B2 | 12/2005 | Ohtsuki et al. |
| 7,034,521 B2 | 4/2006 | Sentoku et al. |
| 7,088,093 B2 | 8/2006 | Teshima et al. |
| 7,232,129 B2 | 6/2007 | Kobayashi |
| 7,901,141 B2 | 3/2011 | Takahashi |
| 7,927,018 B2 | 4/2011 | Heim et al. |
| 2001/0051010 A1 | 12/2001 | Toda et al. |
| 2003/0016892 A1 | 1/2003 | Vignotto et al. |
| 2003/0230849 A1 | 12/2003 | Vignotto et al. |
| 2007/0024273 A1 | 2/2007 | Kobayashi |
| 2007/0211974 A1 | 9/2007 | Toth et al. |
| 2010/0046873 A1 | 2/2010 | Takimoto et al. |
| 2010/0092117 A1 | 4/2010 | Ono et al. |

FOREIGN PATENT DOCUMENTS

| | | |
|---|---|---|
| JP | 11-218542 | 8/1999 |
| JP | 2001-355742 | 12/2001 |
| JP | 2002-340921 | 11/2002 |
| JP | 2003-294048 | 10/2003 |
| JP | 2004-11827 | 1/2004 |
| JP | 2004-093554 | 3/2004 |
| JP | 2006-64180 | 3/2006 |

SEALING DEVICE

CROSS-REFERENCE TO RELATED APPLICATIONS

This is a continuation of U.S. Ser. No. 12/225,510 filed Sep. 23, 2008, which is a national stage of the International Application No. PCT/JP2007/055174 filed Mar. 15, 2007, all of which claim priority to Japanese Patent Application No. 2006-098356 filed Mar. 31, 2006 and all of which are expressly incorporated by reference herein in their entirety.

BACKGROUND OF THE INVENTION

1. Field of the Invention

The present invention relates to a sealing device for sealing an outer periphery of a rotating body, and more particularly to a sealing device provided with a pulsar ring of a rotary encoder for detecting a rotation.

2. Description of the Conventional Art

FIG. 8 is a cross sectional view showing a sealing device for sealing a bearing portion of a wheel suspension device for a motor vehicle by cutting it along a plane passing through an axis O. This kind of sealing device 100 is also called as a hub seal, and is structured to be installed between an outer ring 201 and an inner ring 202 of a bearing 200 in order to prevent muddy water or the like from making an intrusion into a bearing inner portion B from a bearing outer portion A.

In particular, the sealing device 100 shown in FIG. 8 is provided with a metal installation ring 101 pressure-inserted and fitted to an inner peripheral surface of the outer ring 201 of the bearing 200, and a side lip 102 and a radial lip 103 integrally provided on the installation ring 101, and the side lip 102 and the radial lip 103 are slidably brought into close contact with a slinger 104 tightly fitted to an outer peripheral surface of the inner ring 202. Describing in detail, the side lip 102 and the radial lip 103 are made of a rubber-like elastic material, and are integrally bonded by vulcanization to the installation ring 101 via a common base portion 106. The side lip 102 is slidably brought into close contact with an inner side surface of a seal flange portion 104a of the slinger 104 by its tip end, and the radial lip 103 at an inner peripheral side thereof is slidably brought into close contact with an outer peripheral surface of a sleeve 104b of the slinger 104 by an inner peripheral edge of its tip end directed to an outer side.

In this case, this kind of sealing device 100 includes a sealing device provided with a rotary encoder for detecting a rotating speed and an angle of rotation of a shaft in addition, and a structure, for example, disclosed in Japanese Unexamined Patent Publication No. 2004-93554 has been conventionally known as a typical example. FIG. 9 is a cross sectional view showing the same kind of conventional sealing device with the encoder as the in Japanese Unexamined Patent Publication No. 2004-93554 by cutting it along a plane passing through an axis O.

In particular, the sealing device with the encoder disclosed in the patent document 1 is structured such that, as shown in FIG. 9, a pulsar ring 105, which is formed by a magnetic rubber and is magnetized to be multipolar at a predetermined pitch in a circumferential direction, is integrally provided on an outer surface of the seal flange portion 104a of the slinger 104 in the sealing device 100 having the specification shown in FIG. 8. In this case, the magnetic rubber is obtained by mixing a magnetic body into a rubber-like elastic material. Further, a magnetic sensor 120 is arranged at an outer side of the pulsar ring 105 so as to oppose thereto in a non-rotating state, and the magnetic sensor 120 constructs the rotary encoder together with the pulsar ring 105, and generates a pulse having a waveform corresponding to a change of a magnetic field caused by rotation of the pulsar ring 105 together with the inner ring 202 of the bearing 200 so as to detect the rotation.

However, it is an actual condition that the pulsar ring 105 for constructing the magnetic type rotary encoder is conventionally applied only to the slinger 104 of the sealing device 100, as shown in FIG. 9.

SUMMARY OF THE INVENTION

Problem to be Solved by the Invention

The present invention is made by taking the points mentioned above into consideration, and a main technical object of the present invention is to provide a sealing device in which a pulsar ring is applied to another rotating side member than a slinger, and the other technical object of the present invention is to provide a sealing device having an excellent sealing performance.

Means for Solving the Problem

As a means for effectively achieving the technical objects mentioned above, in accordance with a first aspect of the present invention, there is provided a sealing device comprising:

a stationary side installation ring tightly fitted and fixed to a stationary side member;

a rotation side installation ring tightly fitted and fixed to a rotation side member;

a stationary side lip integrally provided on the stationary side installation ring and slidably brought into close contact with the rotation side installation ring by its tip end portion;

rotation side lips integrally formed on the rotation side installation ring and slidably brought into close contact with the stationary side installation ring by their tip end portions; and a pulsar ring for a rotary encoder made of a synthetic resin or rubber-like elastic material mixed with a magnetic powder, integrally formed on the rotation side installation ring, and magnetized to be multipolar.

In accordance with a second aspect of the present invention, there is provided a sealing device as recited in the first aspect, wherein a collar portion is provided in an extending manner on an outer peripheral portion of the pulsar ring so as to be positioned at an outer side than the rotation side lips and to be close and oppose to the stationary side member or the stationary side installation ring.

In accordance with a third aspect of the present invention, there is provided a sealing device as recited in the first or second aspect, wherein the rotation side installation ring is constituted by first and second rotation side installation rings which are fitted and attached to each other, the rotation side lips are provided on the first rotation side installation ring which is arranged at a relatively inner side, and the pulsar ring is provided on an inner surface of the second rotation side installation ring which is constituted by a non-magnetic body and arranged at a relatively outer side.

In accordance with a fourth aspect of the present invention, there is provided a sealing device as recited in the first or second aspect, wherein the rotation side installation ring is constituted by a first rotation side installation ring which is provided with the rotation side lips and is arranged at a relatively inner side, and a second rotation side installation ring which is provided with the pulsar ring and is arranged at a relatively outer side, and the second rotation side installation ring is fitted and attached to a base portion of the rotation side lips.

Effect of the Invention

In accordance with the sealing device on the basis of the first aspect of the present invention, since the rotation side lips and the pulsar ring are integrally formed on the rotation side installation ring, it is possible to suppress an enlargement of size caused by an addition of the pulsar ring, and the rotation side lips and the pulsar ring can be simultaneously formed on the rotation side installation ring. Accordingly, it is possible to suppress an increase of a manufacturing cost.

In accordance with the sealing device on the basis of the second aspect of the present invention, since the outer peripheral portion of the pulsar ring is provided in the extending manner with the collar portion which is close and opposes to the stationary side member or the stationary side installation ring at the outer side of the rotation side lips, it is possible to achieve a spattering operation due to centrifugal force and a labyrinth seal operation. Accordingly, it is possible to improve a sealing performance. Further, since a wide magnetized surface can be secured, it is possible to obtain a stable magnetic characteristic.

In accordance with the sealing device on the basis of the third aspect of the present invention, since a magnetic field of the pulsar ring provided at the inner side of the second rotation side installation ring can be detected by the magnetic sensor arranged at the outer side by making the second rotation side installation ring with a non-magnetic body, and the pulsar ring is protected by the second rotation side installation ring, it is possible to make the magnetic field of the pulsar ring to be hardly affected by a disturbance from outside.

In accordance with the sealing device on the basis of the fourth aspect of the present invention, specification can be modified so as to include a rotary encoder by fitting and attaching a second rotation side installation ring provided with a pulsar ring to a base portion of rotation side lips in an existing sealing device, and it is possible to easily select whether or not the specification includes a the rotary encoder.

DETAILED DESCRIPTION OF PREFERRED EMBODIMENT

Figure 1:
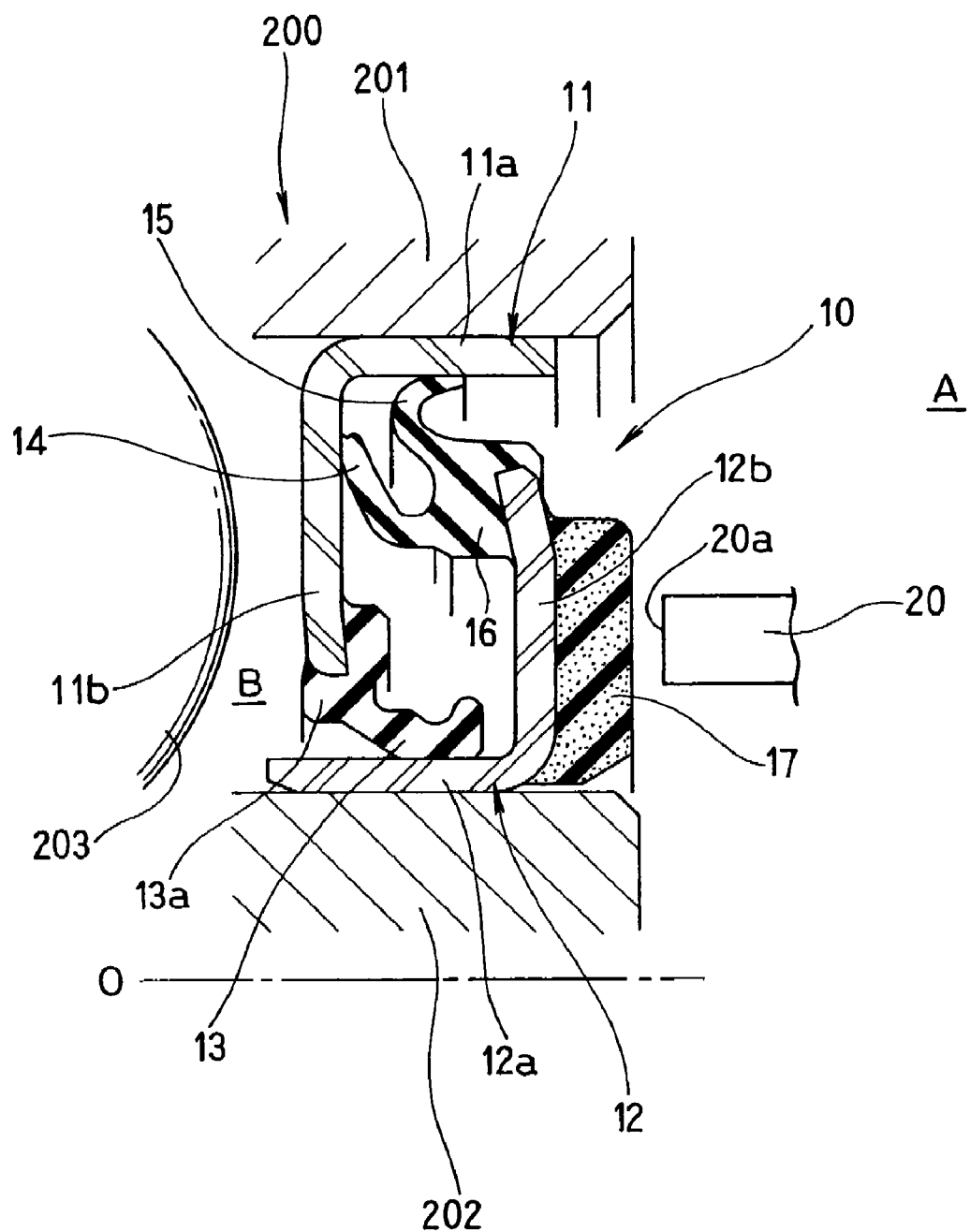
FIG. 1 is a cross sectional view showing a sealing device in accordance with a first embodiment of the present invention by cutting it along a plane passing through an axis O.
Figure 2:
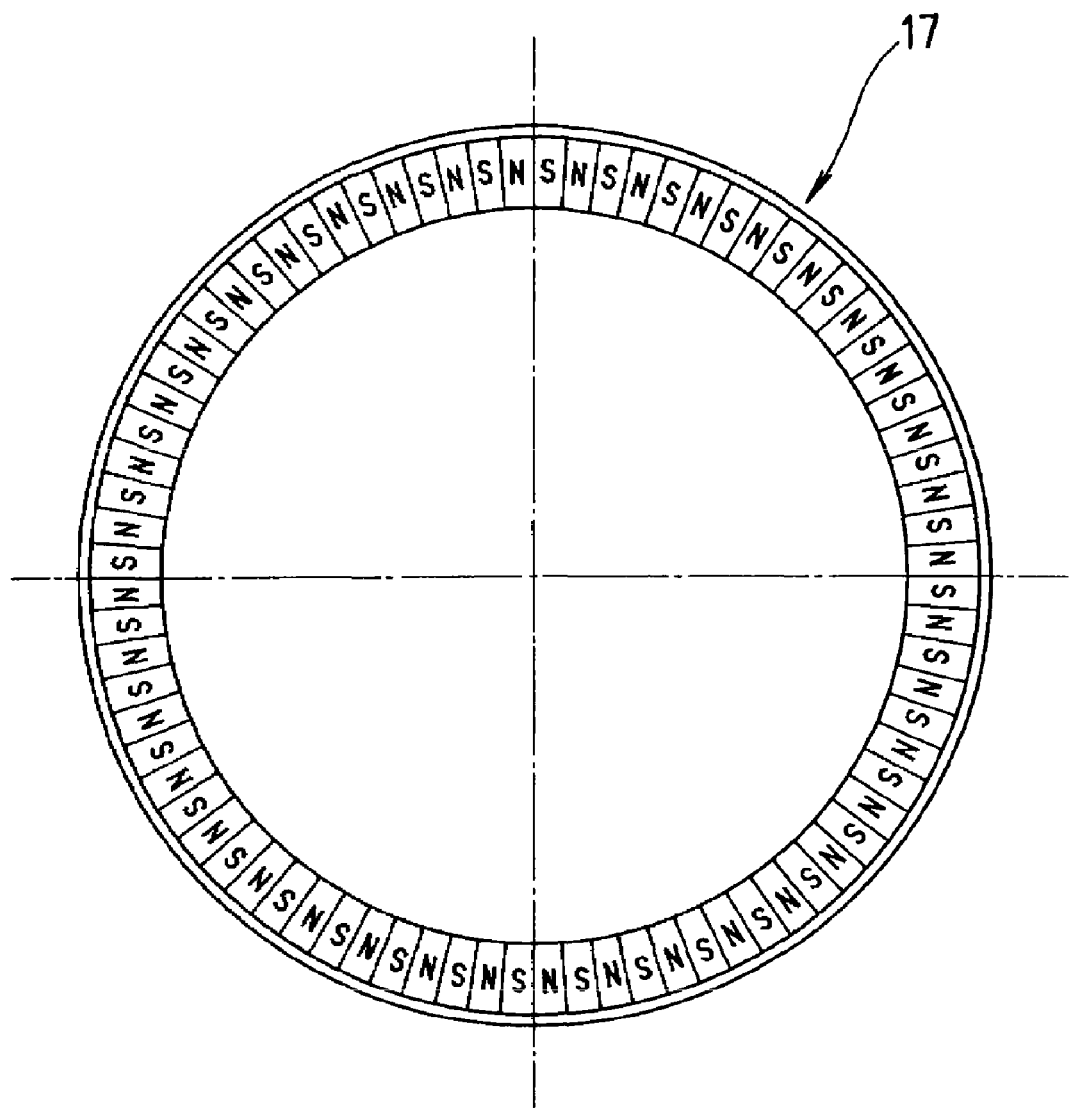
FIG. 2 is an explanatory view showing an example of a magnetization pattern of a pulsar ring.

A description will be given below of a preferable embodiment of the sealing device in accordance with the present invention with reference to the accompanying drawings. FIG. 1 is a cross sectional view showing a sealing device in accordance with a first embodiment of the present invention by cutting it along a plane passing through an axis O, and FIG. 2 is an explanatory view showing an example of a magnetization pattern of a pulsar ring.

In FIG. 1, reference numeral 200 denotes a bearing rotatably supporting a wheel in a suspension device of a motor vehicle. A lot of steel balls 203 are interposed between an outer ring 201 and an inner ring 202 arranged concentrically in an inner periphery of the outer ring. In this case, the outer ring 201 does not rotate, and corresponds to the stationary side member described in the first aspect of the invention, and the inner ring 202 rotates together with a shaft (not shown), and corresponds to the rotation side member described in the first aspect of the invention.

The sealing device 10 is constituted by a stationary side installation ring 11 pressure-inserted and fitted to an inner peripheral surface of an end portion of the outer ring 201 of the bearing 200, a rotation side installation ring 12 tightly fitted and fixed to an outer peripheral surface of the inner ring 202, an inner peripheral lip 13 integrally provided on the stationary side installation ring 11, a side lip 14 and an outer peripheral lip 15 integrally provided on the rotation side installation ring 12, and a pulsar ring 17 for a rotary encoder integrally formed on the rotation side installation ring 12 and magnetized at a predetermined pitch in a circumferential direction. In this case, the inner peripheral lip 13 corresponds to the stationary side lip described in the first aspect of the invention, and the side lip 14 and the outer peripheral lip 15 correspond to the rotation side lips described in the first aspect of the invention.

In detail, the stationary side installation ring 11 is manufactured by punching and pressing a metal plate such as a steel plate or the like to have an approximately L-shape (an illustrated cross sectional shape) in a shape obtained by cutting it along a plane passing through an axis O, and is constituted by an outer peripheral tube portion 11a pressure-inserted and fitted to an inner peripheral surface of the outer ring 201, and an inward flange 11b extending to an inner peripheral side from an end portion at a bearing inner portion B side thereof.

The rotation side installation ring 12 is also manufactured by punching and pressing a metal plate such as a steel plate or the like to have an approximately L-shape (an illustrated cross sectional shape) in a shape obtained by cutting it along a plane passing through the axis O, and is constituted by an inner peripheral tube portion 12a pressure-inserted and fitted to an outer peripheral surface of the inner ring 202, and an outward flange 12b extending to an outer peripheral side from an end portion at a bearing outer portion A side thereof.

The inner peripheral lip 13 is integrally formed on the stationary side installation ring 11 by positioning and setting the stationary side installation ring 11 to which a vulcanization adhesive agent is previously applied, within a predetermined metal mold, then clamping the mold, filling a rubber forming material into a forming cavity defined between the metal mold and the stationary side installation ring 11, and heating and pressurizing the material, and is structured such that a base portion 13a is bonded by vulcanization to an inner diameter portion of the inward flange 11b of the stationary side installation ring 11, and extends in a taper shape toward an inner peripheral side therefrom and so as to be directed to an opposite side to the bearing inner portion B, and an inner periphery of a tip end portion is slidably brought into close contact with an outer peripheral surface of the inner peripheral tube portion 12a of the rotation side installation ring 12.

The side lip 14 and the outer peripheral lip 15 are integrally formed on the rotation side installation ring 12 by positioning and setting the rotation side installation ring 12 to which a vulcanization adhesive agent is previously applied, within a metal mold (not shown), then clamping the mold, filling a rubber forming material into a forming cavity defined between the metal mold and the rotation side installation ring 12, and heating and pressurizing the material, and is structured such that a common base portion 16 is bonded by vulcanization to an outer diameter portion of the outward flange 12b of the rotation side installation ring 12.

Among them, the side lip 14 is positioned at the outer peripheral side of the inner peripheral lip 13, is formed in a conical tubular shape having a larger diameter at a tip end portion side, from an inner diameter portion of a portion directed to an opposite side to the bearing outer portion A at the base portion 16, and is slidably brought into close contact with an inner surface of the inward flange 11b of the stationary side installation ring 11 by a tip end portion thereof. Further, the outer peripheral lip 15 is positioned at an outer peripheral side of the side lip 14, rises up so as to bend in an approximately C-shape in cross section from an outer diameter portion of the portion directed to the opposite side to the bearing outer portion A at the base portion 16 to an outer peripheral side, and is slidably brought into close contact with the inner peripheral surface of the outer peripheral tube portion 11a of the stationary side installation ring 11 by a tip end portion directed to the bearing outer portion A side.

The pulsar ring 17 is bonded by vulcanization to the outer surface of the outward flange 12b of the rotation side installation ring 12, is made of a synthetic resin or rubber material mixed with magnetic powder such as a ferrite, a rare earth or an alnico for example, and is constituted by a disc-shaped multipolar magnet in which S-poles and N-poles are alternately magnetized at a predetermined pitch in a circumferential direction, as shown in FIG. 2. Further, the pulsar ring 17 can be structured so as to have a crank angle measurement starting point (not shown) for detecting a specific position such as a top dead center of a piston of an engine for example, by setting a portion (not shown) having a different magnetization pitch at one position in the circumferential direction on the like.

Reference numeral 20 in FIG. 1 denotes a magnetic sensor. The magnetic sensor 20 is arranged at one position in the circumferential direction at the bearing outer portion A, is fixed in a non-rotating state by a fixing member (not shown), and is structured such that a detecting surface 20a is close to and opposed to an outer surface of the pulsar ring 17 in an axial direction.

According to the sealing device 10 provided with the structure mentioned above, the side lip 14 and the outer peripheral lip 15 rotating integrally with the inner ring 202 of the bearing 200 are slidably brought into close contact with the inward flange 11b and the outer peripheral tube portion 11a of the non-rotating stationary side installation ring 11, and the non-rotating inner peripheral lip 13 is slidably brought into close contact with the inner peripheral tube portion 12a of the rotation side installation ring 12 rotating integrally with the inner ring 202, thereby preventing a dust, muddy water or the like from making an intrusion into the bearing inner portion B from the bearing outer portion A, and also preventing the grease from flowing out of the bearing inner portion B.

Further, since the pulsar ring 17 rotates integrally with the inner ring 202, the multipolar magnetized N-poles and S-poles alternately passes through the front surface of the detecting surface 20a of the magnetic sensor 20 in the rotating direction, and a pulse-shaped signal having a waveform corresponding to change of a magnetic field is output from the magnetic sensor 20. Therefore, it is possible to measure an angle of rotation and a number of rotations on the basis of a count of the pulse.

Further, in this embodiment, the pulsar ring 17 is integrally formed on the outward flange 12b of the rotation side installation ring 12 together with the side lip 14 and the outer peripheral lip 15. Accordingly, it is possible to simultaneously form (bond by vulcanization) the pulsar ring 17, the side lip 14 and the outer peripheral lip 15 on the rotation side installation ring 12, by forming a cavity for forming the pulsar ring 17, and a cavity for forming the side lip 14 and the outer peripheral lip 15 in a common metal mold, and filling a rubber molding material in the cavity for forming the side lip 14 and the outer peripheral lip 15, and a molding material mixed with magnetic powder in the cavity for forming the pulsar ring 17, at a time of forming them.

Figure 3:
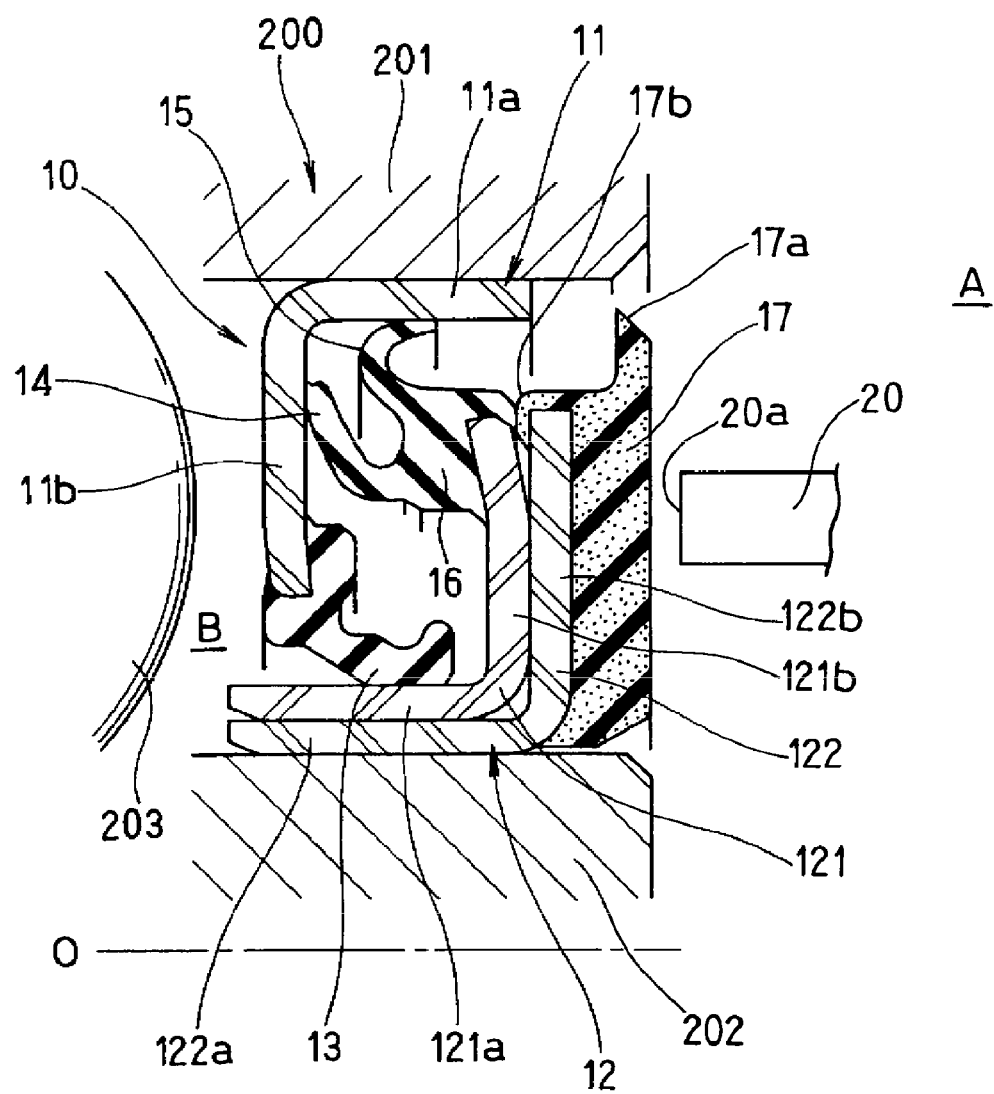
FIG. 3 is a cross sectional view showing a sealing device in accordance with a second embodiment of the present invention by cutting it along a plane passing through an axis O.

Next, FIG. 3 is a cross sectional view showing a sealing device in accordance with a second embodiment of the present invention by cutting it along a plane passing through an axis O.

In this embodiment, the rotation side installation ring 12 is constituted by first and second rotation side installation rings 121 and 122 fitted and attached to each other, the side lip 14 and the outer peripheral lip 15 serving as the rotation side lips are provided on the first rotation side installation ring 121 which is arranged at a relatively inner side, the pulsar ring 17 is provided on the second rotation side installation ring 122 which is arranged at a relatively an outer side, and an outer peripheral portion of the pulsar ring 17 forms a collar portion 17a which is close to and opposes to an inner peripheral surface of the outer ring 201. The other portions are structured basically in the same manner as the first embodiment (FIG. 1) described above.

In detail, the first rotation side installation ring 121 is manufactured by punching and pressing a metal plate such as a steel plate or the like, is formed in an approximately L-shape (an illustrated cross sectional shape) in a shape obtained by cutting along the plane passing through the axis O, and is constituted by an inner peripheral tube portion 121a in which an outer peripheral surface is slidably brought into close contact with an inner periphery of a tip end portion of the inner peripheral lip 13, and an outward flange 121b extending to an outer peripheral side from an end portion at the bearing outer portion A side thereof. Further, the common base portion 16 of the side lip 14 and the outer peripheral lip 15 is bonded by vulcanization to an outer diameter portion of the outward flange 121b of the first rotation side installation ring 121.

Further, the second rotation side installation ring 122 is manufactured by punching and pressing a metal plate such as a steel plate or the like, is formed in an approximately L-shape (an illustrated cross sectional shape) in a shape obtained by cutting it along the plane passing through the axis O, and is constituted by an inner peripheral tube portion 122a in which an outer peripheral surface is fitted and attached integrally to the inner peripheral tube portion 121a of the first rotation side installation ring 121, and an outward flange 122b extending to an outer peripheral side from an end portion at the bearing outer portion A side and superposed with the outward flange 121b of the first rotation side installation ring 121 in the axial direction. Further, the rotation side installation ring 12 is pressure-inserted and fitted to an outer peripheral surface of the inner ring 202 by the inner peripheral tube portion 122a of the second rotation side installation ring 122.

The pulsar ring 17 is bonded by vulcanization to the outer surface of the outward flange 122b of the second rotation side installation ring 122, and the collar portion 17a formed on the outer periphery thereof is close to and opposed to the inner peripheral surface of the outer ring 201 at an outer position than the side lip 14 and the outer peripheral lip 15.

Further, a seal protrusion 17b extending from an outer diameter end of the outward flange 122b of the second rotation side installation ring 122 to an inner side (the first rotation side installation ring 121 side) is formed on the outer peripheral portion of the pulsar ring 17. The seal protrusion 17b achieves sealing between the fitted surfaces of the first rotation side installation ring 121 and the second rotation side installation ring 122 constructing the rotation side installation ring 12, by being brought into close contact with the outward flange 121b of the first rotation side installation ring 121 or the base portion 16 of the side lip 14 and the outer peripheral lip 15.

In accordance with the structure mentioned above, since the pulsar ring 17 has a sealing function, it is possible to improve a sealing performance in comparison with the first embodiment. In other words, since the pulsar ring 17 rotates in a state in which the collar portion 17a formed on the outer peripheral portion thereof is close and opposed to the inner peripheral surface of the outer ring 201 at the outer position than the side lip 14 and the outer peripheral lip 15, it is possible to shut out an intrusion of muddy water, a dust or the like from the bearing outer portion A on the basis of a spattering operation due to centrifugal force. Further, the collar portion 17a achieves a labyrinth effect by making an opposing distance to the inner peripheral surface of the outer ring 201 small. Accordingly, it is possible to maintain an excellent sealing performance in consequence of preventing damage of the side lip 14 and the outer peripheral lip 15 caused by the intrusion of muddy water, a dust or the like.

Further, since a width in a radial direction of the pulsar ring 17 is enlarged by the collar portion 17a, and a wide magnetized surface can be secured, it is possible to obtain a stable magnetic characteristic.

Figure 4:
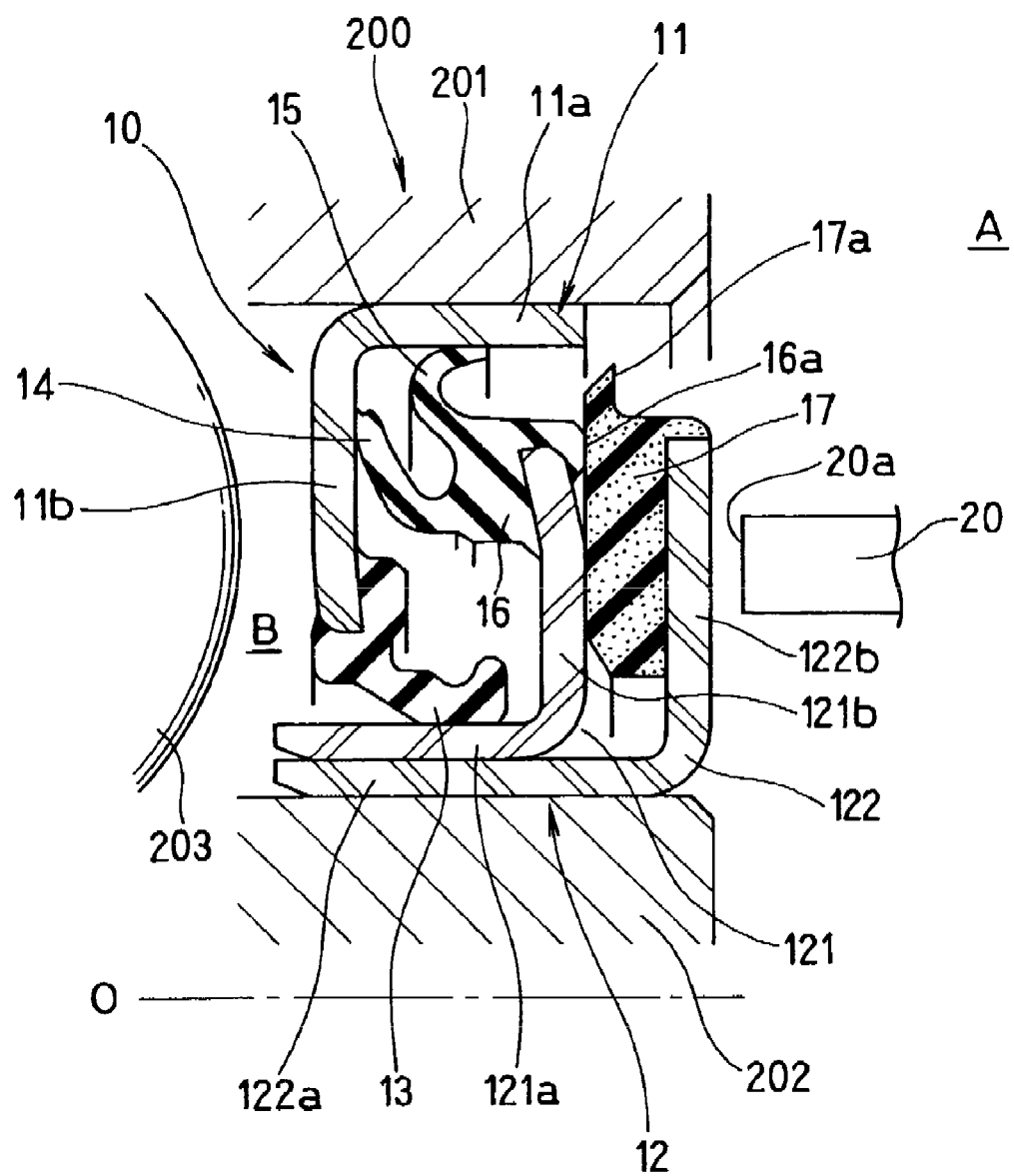
FIG. 4 is a cross sectional view showing a sealing device in accordance with a third embodiment of the present invention by cutting it along a plane passing through an axis O.

Next, FIG. 4 is a cross sectional view showing a sealing device in accordance with a third embodiment of the present invention by cutting it along a plane passing through an axis O.

In this embodiment, in the first and second rotation side installation rings 121 and 122 constructing the rotation side installation ring 12, the second rotation side installation ring 122 which is arranged at a relatively outer side is constituted by a non-magnetic body, and the pulsar ring 17 is bonded by vulcanization integrally to the inner surface of the outward flange 122b of the second rotation side installation ring 122. The other portions are basically provided with the same structures as the second embodiment (FIG. 3) described above.

In other words, as shown in FIG. 4, the pulsar ring 17 is provided in a state of being sandwiched between the outward flange 121b of the first rotation side installation ring 121 and the outward flange 122b of the second rotation side installation ring 122, and the collar portion 17a formed on the outer peripheral portion of the pulsar ring 17 is close and opposed to the end portion of the outer peripheral tube portion 11a of the stationary side installation ring 11 at an outer position than the side lip 14 and the outer peripheral lip 15. Accordingly, the detecting surface 20a of the magnetic sensor 20 arranged at the bearing outer portion A is close and opposed to the outer surface of the outward flange 122b of the second rotation side installation ring 122 in the axial direction, however, the magnetic field of the pulsar ring 17 at the inner side thereof can be detected by forming the second rotation side installation ring 122 with a non-magnetic body.

Further, since the inner surface of the pulsar ring 17 is brought into close contact with the seal protrusion 16a formed on the base portion 16 of the side lip 14 and the outer peripheral lip 15, it is possible to achieve sealing between the fitted surfaces of the first rotation side installation ring 121 and the second rotation side installation ring 122 constructing the rotation side installation ring 12.

In accordance with the structure mentioned above, in addition to the effect obtained by the second embodiment (FIG. 3), since the pulsar ring 17 is protected by the outward flange 122b of the second rotation side installation ring 122, there can be obtained such an advantage that the magnetic field of the pulsar ring 17 is hardly affected by a disturbance from outside.

Figure 5:
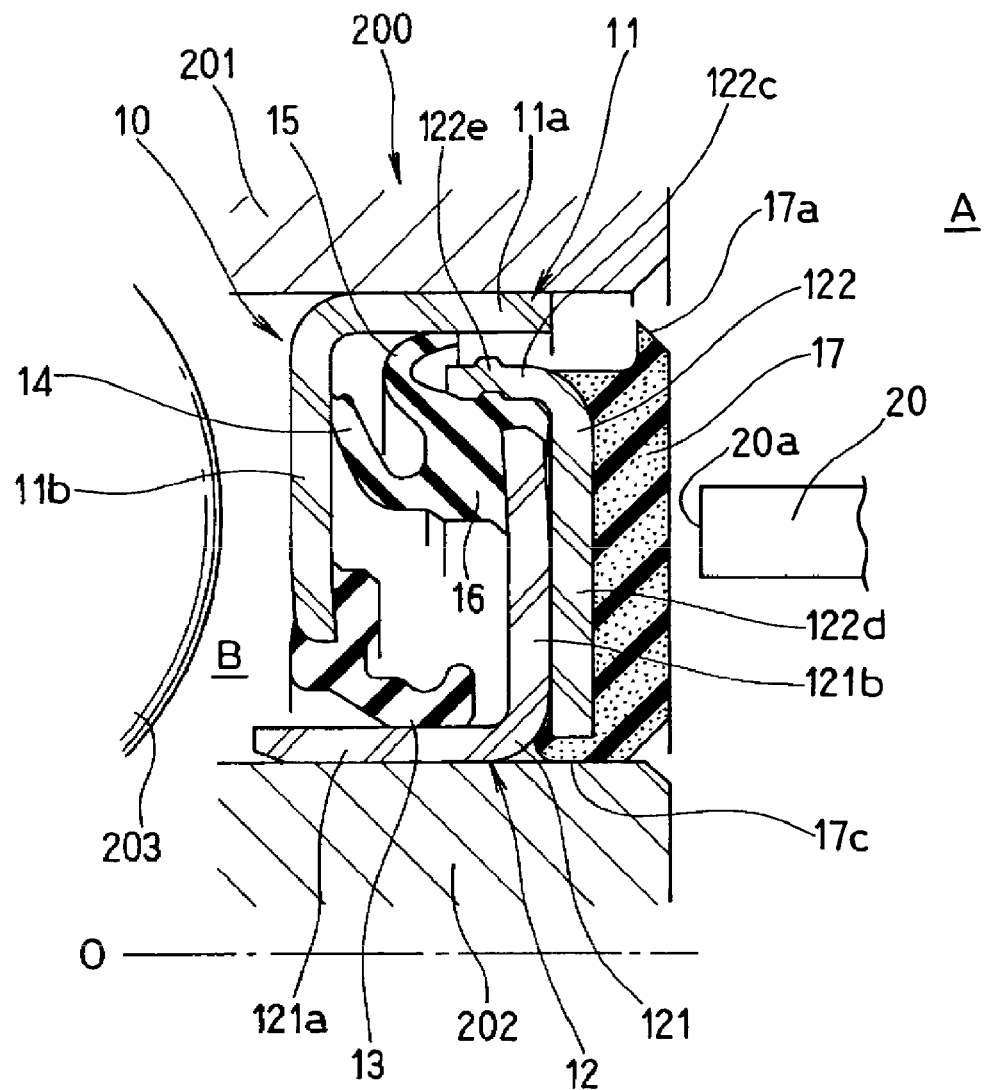
FIG. 5 is a cross sectional view showing a sealing device in accordance with a fourth embodiment of the present invention by cutting it along a plane passing through an axis O.

Next, FIG. 5 is a cross sectional view showing a sealing device in accordance with a fourth embodiment of the present invention by cutting it along a plane passing through an axis O.

In this embodiment, the second rotation side installation ring 122, which is arranged at a relatively outer side, of the rotation side installation ring 12 is fitted and attached to the outer peripheral surface of the base portion 16 of the side lip 14 and the outer peripheral lip 15 by the outer peripheral tube portion 122c, an inner peripheral portion 17c of the pulsar ring 17 integrally provided on the second rotation side installation ring 122 is brought into close contact with the outer peripheral surface of the end portion of the inner ring 202, and the first rotation side installation ring 121, which is arranged at a relatively inner side, is pressure-inserted and fitted to the outer peripheral surface of the inner ring 202 of the bearing 200 by the inner peripheral tube portion 121a thereof. The other portions are structured basically in the same manner as the second embodiment (FIG. 3) described above.

In detail, the second rotation side installation ring 122 is manufactured by punching and pressing a metal plate such as a steel plate or the like, is formed approximately in an L-shape (an illustrated cross sectional shape) in a shape obtained by cutting it along a plane passing through the axis O, as shown in FIG. 5, and is constituted by an outer peripheral tube portion 122c fitted and attached to an outer peripheral surface of the base portion 16 of the side lip 14 and the outer peripheral lip 15, and an inward flange 122d extending to an inner peripheral side from an end portion at the bearing outer portion A side. In the outer peripheral tube portion 122c, there is formed a bent portion 122e for making a part of the base portion 16 thrust thereinto so as to increase fitting force.

In accordance with the structure mentioned above, in addition to the effect obtained by the second embodiment (FIG. 3), there can be obtained such an advantage that it is easy to select whether or not the specification of the sealing device 10 includes a rotary encoder. The reason is that the first rotation side installation ring 121 of the rotation side installation ring 12 is not fitted and attached to the inner ring 202 of the bearing 200 via the second rotation side installation ring 122, but the second rotation side installation ring 122 integrally having the pulsar ring 17 is fitted and attached to the outer peripheral surface of the base portion 16 of the side lip 14 and the outer peripheral lip 15 by the outer peripheral tube portion 122c thereof.

Further, since a width in the radial direction of the pulsar ring 17 is enlarged in the outer diametrical direction by the collar portion 17a, and is also enlarged to the outer peripheral surface position of the end portion of the inner ring 202 in the inner diametrical direction, a wide magnetized surface can be secured, and it is possible to obtain a stable magnetic characteristic.

In this case, various shapes can be considered as a shape of the bent portion 122e for preventing the second rotation side installation ring 122 from coming off, for example, a convex shape thrusting into the outer peripheral surface of the base portion 16 of the side lip 14 and the outer peripheral lip 15, in addition to the illustrated shape.

Figure 6:
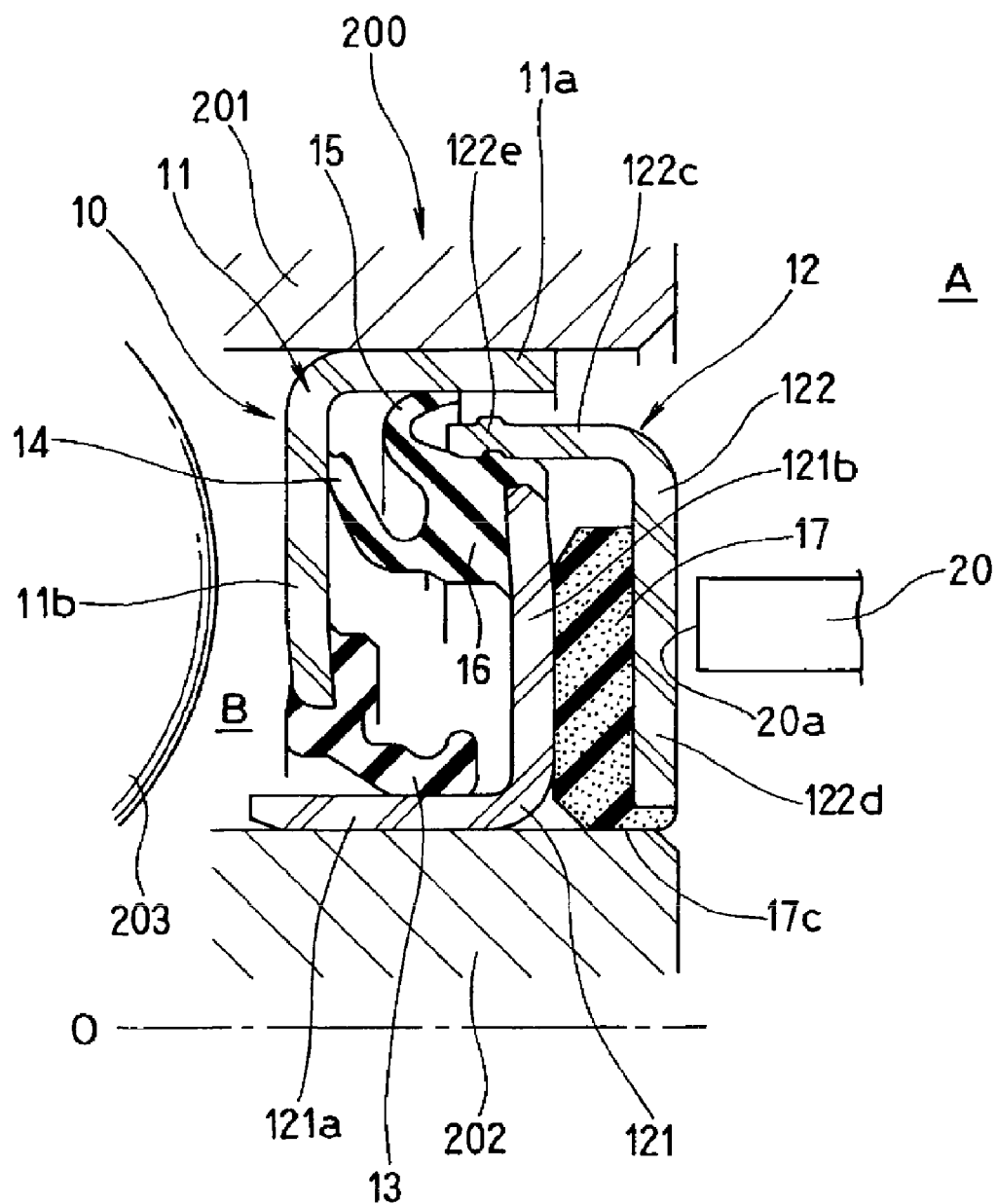
FIG. 6 is a cross sectional view showing a sealing device in accordance with a fifth embodiment of the present invention by cutting it along a plane passing through an axis O.

Next, FIG. 6 is a cross sectional view showing a sealing device in accordance with a fifth embodiment of the present invention by cutting it along a plane passing through an axis O.

The sealing device 10 in accordance with this embodiment is structured such that the second rotation side installation ring 122 in the fourth embodiment (FIG. 5) mentioned above is constituted by a non-magnetic body, and the pulsar ring 17 is bonded by vulcanization integrally to an inner surface of an inward flange 122d of the second rotation side installation ring 122. Accordingly, since the outer peripheral side of the pulsar ring 17 is covered by the outer peripheral tube portion 122c of the second rotation side installation ring 122, the pulsar ring 17 is structured such that the collar portion 17a as shown in FIG. 5 does not exist. The other structures are basically the same as the fourth embodiment (FIG. 5).

In other words, as shown in FIG. 6, the pulsar ring 17 is provided in a state of being sandwiched between the outward flange 121b of the first rotation side installation ring 121 and the inward flange 122d of the second rotation side installation ring 122. Accordingly, the detecting surface 20a of the magnetic sensor 20 arranged at the bearing outer portion A is close and opposed to the outer surface of the inward flange 122d of the second rotation side installation ring 122 in the axial direction, however, the magnetic field of the pulsar ring 17 existing at the inner side thereof can be detected by forming the second rotation side installation ring 122 with a non-magnetic material in the same manner as the third embodiment (FIG. 4) described above.

Further, in this embodiment, since the first rotation side installation ring 121 of the rotation side installation ring 12 is fitted and attached to the inner ring 202 of the bearing 200 by the inner peripheral tube portion 121a in the same manner as the fourth embodiment (FIG. 5), and the second rotation side installation ring 122 integrally having the pulsar ring 17 is fitted and attached to the outer peripheral surface of the base portion 16 of the side lip 14 and the outer peripheral lip 15 by the outer peripheral tube portion 122c thereof, it is possible to easily select whether or not the specification of the sealing device 10 includes a rotary encoder.

Figure 7:
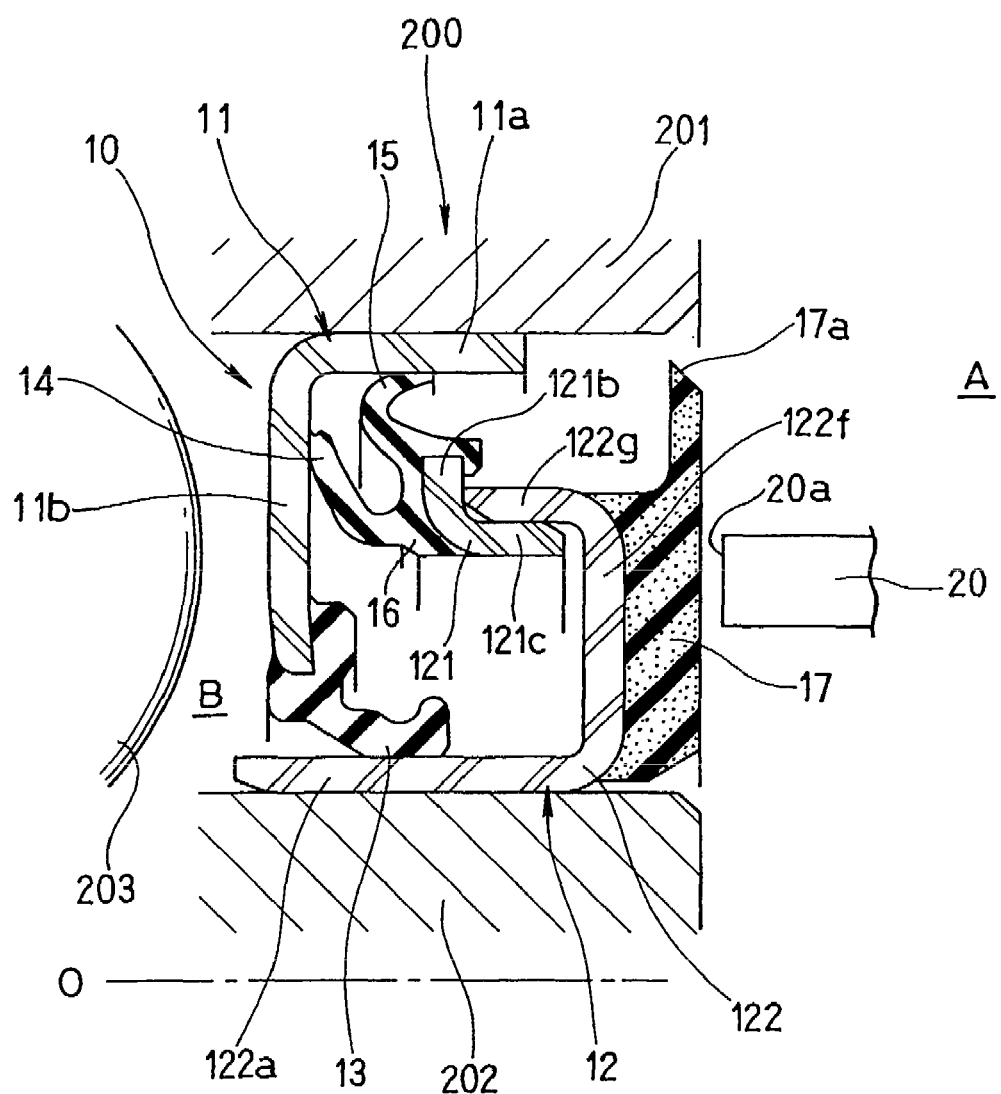
FIG. 7 is a cross sectional view showing a sealing device in accordance with a sixth embodiment of the present invention by cutting it along a plane passing through an axis O.
Figure 8:
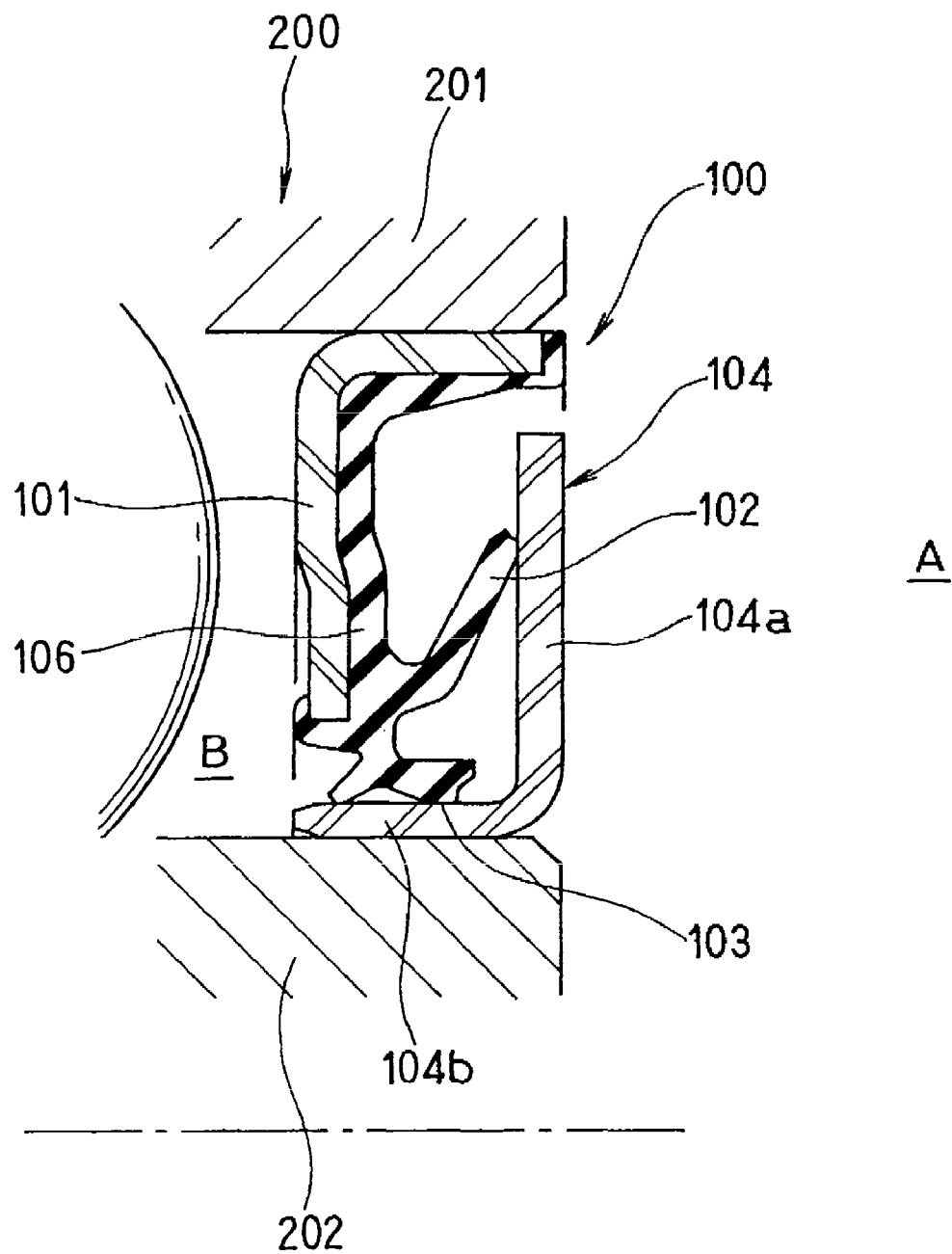
FIG. 8 is a cross sectional view showing a sealing device for sealing a bearing portion of a wheel suspension device for a motor vehicle by cutting it along a plane passing through an axis O.
Figure 9:
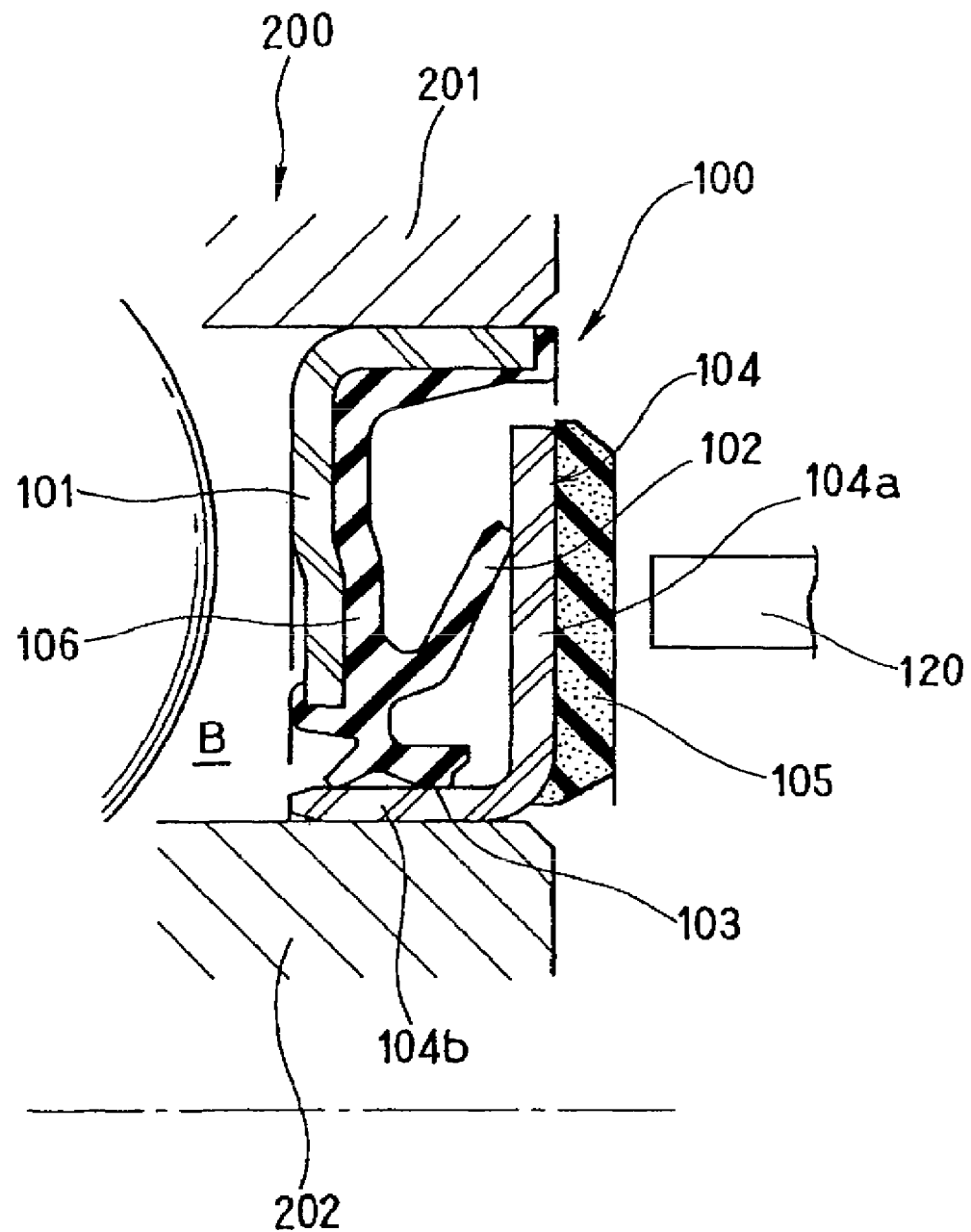
FIG. 9 is a cross sectional view showing a conventional sealing device with an encoder by cutting it along a plane passing through an axis O.

Next, FIG. 7 is a cross sectional view showing a sealing device in accordance with a sixth embodiment of the present invention by cutting it along a plane passing through an axis O.

In accordance with this embodiment, the rotation side installation ring 12 is structured such that the first rotation side installation ring 121 integrally having the side lip 14 and the outer peripheral lip 15 is fitted and attached to the outer peripheral portion of the second rotation side installation ring 122 integrally having the pulsar ring 17, and the inner peripheral lip 13 bonded by vulcanization to the inner diameter portion of the inward flange 11b of the stationary side installation ring 11 is slidably brought into close contact with the outer peripheral surface of the inner peripheral tube portion 122a of the second rotation side installation ring 122 pressure-inserted and fitted to the outer peripheral surface of the inner ring 202 of the bearing 200. The other portions are structured basically in the same manner as the second embodiment (FIG. 3) or the fourth embodiment (FIG. 5) described above.

In detail, the first rotation side installation ring 121 is manufactured by punching and pressing a metal plate such as a steel plate or the like, and is formed approximately in an L-shape (an illustrated cross sectional shape) in a shape obtained by cutting it along the plane passing through the axis O, that is, constituted by the outward flange 121b, on which the common base portion 16 of the side lip 14 and the outer peripheral lip 15 is bonded by vulcanized, and the inner peripheral tube portion 121c which is bent toward the bearing outer portion A side from the inner periphery thereof.

Further, the second rotation side installation ring 122 is manufactured by punching and pressing a metal plate such as a steel plate or the like, is formed approximately in a C-shape (an illustrated cross sectional shape) in a shape obtained by cutting it along the plane passing through the axis O, and is constituted by an inner peripheral tube portion 122a which is pressure-inserted and fitted to the outer peripheral surface of the inner ring 202 of the bearing 200 by its inner peripheral surface, a radial portion 122f which extends to an outer peripheral side from an end portion at the bearing outer portion A side thereof, and an outer peripheral tube portion 122g which extends toward the bearing inner space B side from an outer peripheral end thereof. Further, the inner peripheral tube portion 121c of the first rotation side installation ring 121 is pressure-inserted and fitted to an inner periphery of the outer peripheral tube portion 122g of the second rotation side installation ring 122, whereby the first and second rotation side installation rings 121 and 122 are integrated with each other so as to construct the rotation side installation ring 12.

Further, the pulsar ring 17 is bonded by vulcanization to an outer surface of the radial portion 122f of the second rotation side installation ring 122, and the collar portion 17a formed on an outer periphery thereof is close and opposed to an inner peripheral surface of the outer ring 201 at an outer position than the side lip 14 and the outer peripheral lip 15.

In accordance with the structure mentioned above, it is possible to achieve the same effects as the second embodiment (FIG. 3) or the fourth embodiment (FIG. 5) described above.

INDUSTRIAL APPLICABILITY

The present invention can be utilized as a sealing device provided with a pulsar ring of a rotary encoder for detecting a rotation.

What is claimed is:

1. A sealing device comprising:
a stationary side installation ring tightly fitted and fixed to a stationary side member;
a rotation side installation ring tightly fitted and fixed to a rotation side member;
a stationary side lip integrally provided on the stationary side installation ring and slidably brought into close contact with the rotation side installation ring by its tip end portion;
rotation side lips integrally formed on the rotation side installation ring and slidably brought into close contact with the stationary side installation ring by their tip end portions; and
a pulsar ring for a rotary encoder made of a synthetic resin or rubber-like elastic material, mixed with magnetic powder, integrally formed on the rotation side installation ring, and magnetized to be multipolar,
wherein the rotation side installation ring is constituted by first and second rotation side installation rings which are fitted and attached to each other, the rotation side lips are provided on the first rotation side installation ring arranged at a relatively inner side, and the pulsar ring is provided on the second rotation side installation ring arranged at a relatively outer side,
the pulsar ring is provided on an outer surface of the second rotation side installation ring,
the first rotation side installation ring is constituted by a first inner peripheral tube portion in which an outer peripheral surface is slidably brought into close contact with an inner periphery of the stationary side lip, and a first flange extending outwardly from one end portion of the first inner peripheral tube portion,
the second rotation side installation ring is constituted by a second inner peripheral tube portion in which an outer peripheral surface is fitted and attached integrally to the first inner peripheral tube portion of the first rotation side installation ring, and a second flange extending outwardly from one end portion of the second inner peripheral tube portion and superposed with the first flange, of the first rotation side installation ring in an axial direction,
the pulsar ring is bonded by vulcanization to an outer surface of the second flange of the second rotation side installation ring, and
the rotation side installation ring is pressure-inserted and fitted to an outer peripheral surface of the rotation side member by the second inner peripheral tube portion of the second rotation side installation ring.

2. A sealing device comprising:
a stationary side installation ring tightly fitted and fixed to a stationary side member;
a rotation side installation ring tightly fitted and fixed to a rotation side member;
a stationary side lip integrally provided on the stationary side installation ring and slidably brought into close contact with the rotation side installation ring by its tip end portion;
rotation side lips integrally formed on the rotation side installation ring and slidably brought into close contact with the stationary side installation ring by their tip end portions; and
a pulsar ring for a rotary encoder made of a synthetic resin or rubber-like elastic material, mixed with magnetic powder, integrally formed on the rotation side installation ring, and magnetized to be multipolar,
wherein the rotation side installation ring is constituted by first and second rotation side installation rings which are fitted and attached to each other, the rotation side lips are provided on the first rotation side installation ring arranged at a relatively inner side, and the pulsar ring is provided on the second rotation side installation ring arranged at a relatively outer side,
the pulsar ring is provided on an outer surface of the second rotation side installation ring, and
a collar portion is provided in an extending manner on an outer peripheral portion of the pulsar ring so as to be close to and opposed to the stationary side member at an outer position than the rotation side lips.

3. A sealing device comprising:
a stationary side installation ring tightly fitted and fixed to a stationary side member;
a rotation side installation ring tightly fitted and fixed to a rotation side member;
a stationary side lip integrally provided on the stationary side installation ring and slidably brought into close contact with the rotation side installation ring by its tip end portion;
rotation side lips integrally formed on the rotation side installation ring and slidably brought into close contact with the stationary side installation ring by their tip end portions; and
a pulsar ring for a rotary encoder made of a synthetic resin or rubber-like elastic material, mixed with magnetic powder, integrally formed on the rotation side installation ring, and magnetized to be multipolar,
wherein the rotation side installation ring is constituted by first and second rotation side installation rings which are fitted and attached to each other, the rotation side lips are provided on the first rotation side installation ring arranged at a relatively inner side, and the pulsar ring is provided on the second rotation side installation ring arranged at a relatively outer side,
the second rotation side installation ring is constituted by a non-magnetic body, and the pulsar ring is provided on an inner surface of the second rotation side installation ring, and
a collar portion is provided in an extending manner on an outer peripheral portion of the pulsar ring so as to be close to and opposed to the stationary side member at an outer position than the rotation side lips.

4. A sealing device comprising:
a stationary side installation ring tightly fitted and fixed to a stationary side member;
a rotation side installation ring tightly fitted and fixed to a rotation side member;
a stationary side lip integrally provided on the stationary side installation ring and slidably brought into close contact with the rotation side installation ring by its tip end portion;
rotation side lips integrally formed on the rotation side installation ring and slidably brought into close contact with the stationary side installation ring by their tip end portions; and
a pulsar ring for a rotary encoder made of a synthetic resin or rubber-like elastic material, mixed with magnetic powder, integrally formed on the rotation side installation ring, and magnetized to be multipolar,
wherein the rotation side installation ring is constituted by first and second rotation side installation rings which are fitted and attached to each other, the rotation side lips are provided on the first rotation side installation ring arranged at a relatively inner side, and the pulsar ring is provided on the second rotation side installation ring arranged at a relatively outer side,
the pulsar ring is provided on an outer surface of the second rotation side installation ring,
the first rotation side installation ring is constituted by a first inner peripheral tube portion in which an outer peripheral surface is slidably brought into close contact with an inner periphery of the stationary side lip, and a first flange extending outwardly from one end portion of the first inner peripheral tube portion,
the second rotation side installation ring is constituted by a second inner peripheral tube portion in which an outer peripheral surface is fitted and attached integrally to the first inner peripheral tube portion of the first rotation side installation ring, and a second flange extending outwardly from one end portion of the second inner peripheral tube portion and superposed with the first flange of the first rotation side installation ring in an axial direction, the pulsar ring is bonded by vulcanization to an outer surface of the second flange of the second rotation side installation ring, the rotation side installation ring is pressure-inserted and fitted to an outer peripheral surface of the rotation side member by the second inner peripheral tube portion of the second rotation side installation ring, and a collar portion is provided in an extending manner on an outer peripheral portion of the pulsar ring so as to be close to and opposed to the stationary side member at an outer position than the rotation side lips.

5. A sealing device comprising:

a stationary side installation ring tightly fitted and fixed to a stationary side member;

a rotation side installation ring tightly fitted and fixed to a rotation side member;

a stationary side lip integrally provided on the stationary side installation ring and slidably brought into close contact with the rotation side installation ring by its tip end portion;

rotation side lips integrally formed on the rotation side installation ring and slidably brought into close contact with the stationary side installation ring by their tip end portions; and a pulsar ring for a rotary encoder made of a synthetic resin or rubber-like elastic material, mixed with magnetic powder, integrally formed on the rotation side installation ring, and magnetized to be multipolar, wherein the rotation side installation ring is constituted by first and second rotation side installation rings which are fitted and attached to each other, the rotation side lips are provided on the first rotation side installation ring arranged at a relatively inner side, and the pulsar ring is provided on the second rotation side installation ring arranged at a relatively outer side, the second rotation side installation ring is constituted by a non-magnetic body, and the pulsar ring is provided on an inner surface of the second rotation side installation ring, the first rotation side installation ring is constituted by a first inner peripheral tube portion in which an outer peripheral surface is slidably brought into close contact with an inner periphery of the stationary side lip, and a first flange extending outwardly from one end portion of the first inner peripheral tube portion, the second rotation side installation ring is constituted by a second inner peripheral tube portion in which an outer peripheral surface is fitted and attached integrally to the first inner peripheral tube portion of the first rotation side installation ring, and a second flange extending outwardly from one end portion of the second inner peripheral tube portion and superposed with the first flange of the first rotation side installation ring in an axial direction, the pulsar ring is bonded by vulcanization to an outer surface of the second flange of the second rotation side installation ring, the rotation side installation ring is pressure-inserted and fitted to an outer peripheral surface of the rotation side member by the second inner peripheral tube portion of the second rotation side installation ring, and a collar portion is provided in an extending manner on an outer peripheral portion of the pulsar ring so as to be close to and opposed to the stationary side member at an outer position than the rotation side lips.

\* \* \* \* \*